Dec. 20, 1960     W. L. CLARK, JR     2,965,097
ADJUSTABLE BARBECUE GRILLS
Filed Feb. 19, 1958
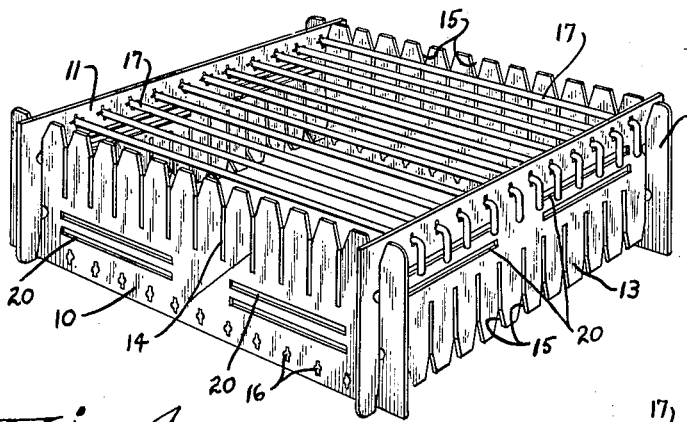
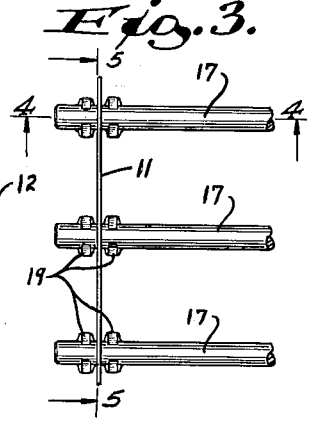
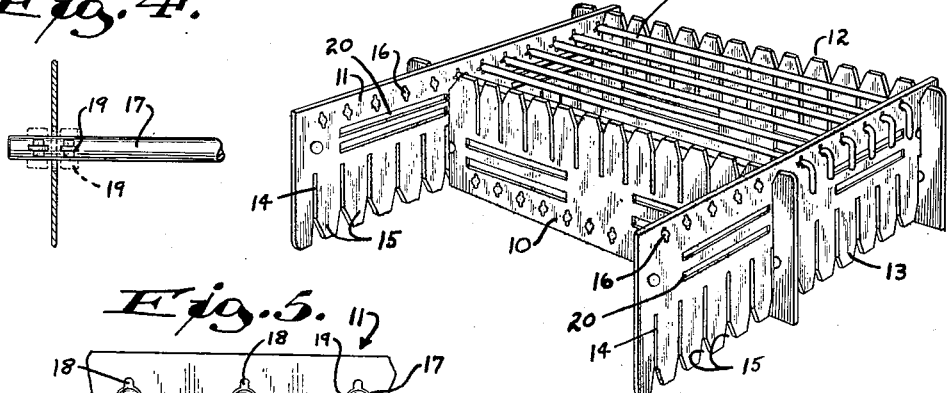
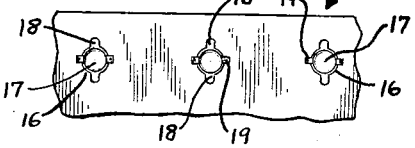
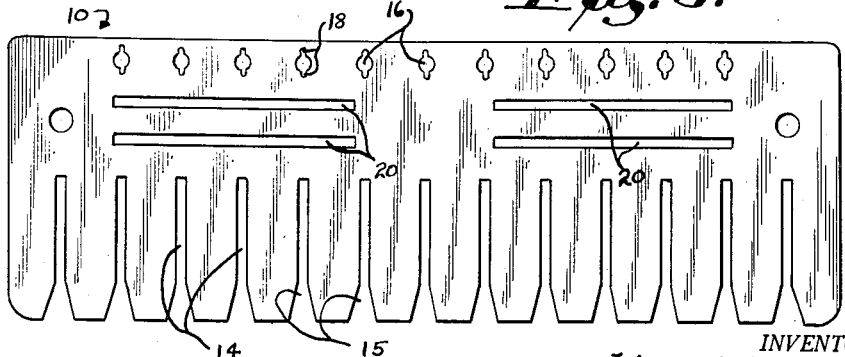
INVENTOR.
Walter Lawrence Clark Jr.
BY Morsell & Morsell
ATTORNEYS.

United States Patent Office 2,965,097
Patented Dec. 20, 1960

2,965,097

ADJUSTABLE BARBECUE GRILLS

Walter Lawrence Clark, Jr., 320 E. Lake View Ave., Milwaukee, Wis.

Filed Feb. 19, 1958, Ser. No. 716,061

1 Claim. (Cl. 126—30)

This invention relates to improvements in adjustable barbecue grills.

Because a conventional grill is relatively large in size in order to accommodate a fuel bed and provide a cooking area sufficient for the preparation of food for a number of people, the conventional grill is necessarily wasteful as to fuel when it is desired to prepare food for only a few persons.

With the above in mind it is, therefore, a general object of the present invention to provide an adjustable barbecue grill wherein the size of the grill may be easily and quickly adjusted for cooking different quantities of food and for limiting and confining the required fuel supply. Pursuant to the present invention, four similar intermeshing wall members are provided which can be arranged to create a grill of various sizes, within certain limits, thereby making it possible to provide a limited and confined fuel bed space and cooking area in which the latter accommodates only enough food for the number of people to be served. In addition to conserving fuel, the present invention makes the grilling procedure more rapid and efficient.

Another object of the invention is to provide a barbecue grill which may be so arranged as to provide a surface area for maintaining food warm after it has been cooked, or for warming rolls, buns or the like.

Another object of the present invention is to provide an adjustable grill which can be utilized within a conventional grill in order to conserve the amount of fuel used therein, or it may itself be used as a complete independent grill and placed on the ground, on a floor surface, or in a fireplace.

Still another object of the present invention is to provide an adjustable grill composed solely of four identical interlocking wall elements and a number of identical rods, the simplicity of construction and the interchangeable nature of the members making the grill susceptible of being assembled and adjusted by a novice. Additionally, in its collapsed form the grill affords a very compact package which is easy to ship and store.

A further object of the invention is to provide a grill in which the rods forming the top surface or cooking grate may be locked in position to insure against their inadvertent movement or withdrawal while the grill is in use, and which rods may be quickly and easily unlocked and removed when it is desired to disassemble or modify the size of the grill.

A further object of the invention is to provide a grill wherein the components, due to the flat surfaces and easy separation thereof, may be readily cleaned and maintained in a sanitary condition.

Yet another object of the invention resides in providing a grill in which the two sets of elements can be stamped from thin gauge metal from two simple dies, resulting in a durable product which can be efficiently and economically manufactured.

A further object of the invention is to provide a grill which is of very simple construction, which is neat and attractive in appearance, which is easily assembled and adjusted, which is strong and durable, and which is well adapted for the purposes described.

These and other objects of the present invention will be apparent from the following description of the accompanying drawing which illustrates a preferred embodiment thereof and wherein:

Fig. 1 is a perspective view of the grill structure in an assembled position, the walls being fully outwardly extended to provide a grill of maximum size;

Fig. 2 is a perspective view of the structure with one of its walls positioned inwardly to provide a rectangular grill of a smaller size than that shown in Fig. 1;

Fig. 3 is an enlarged fragmentary top view of one wall member and the rods which form the top of the grill, showing the lugs on one set of ends of the rods removably engaged in openings therefor in the wall member;

Fig. 4 is an enlarged fragmentary sectional view, taken on line 4—4 of Fig. 3, showing the rod lugs in position within the openings in a wall member;

Fig. 5 is a fragmentary end view, taken on line 5—5 of Fig. 3, showing the rods in locked position relative to a wall member; and Fig. 6 is a side elevational view of a wall member.

Referring more particularly to the drawing, the numerals 10, 11, 12 and 13 designate the identical wall members forming the sides and ends of the grill. Each of said members has a plurality of spaced vertical slots 14 extending approximately one-half the height of said members, which slots provide means for intermeshingly joining the wall members in addition to serving as draft and exhaust ports. Said slots have enlargements 15 at their outer ends which are slightly tapered to facilitate the intermeshing illustrated action. In its assembled position, two of the transverse sides of the structure have their slotted openings directed upwardly, as members 10 and 12 in Fig. 1, and the other two wall members 11 and 13 have their slotted portions directed downwardly. The wall members may all be interlocked adjacent their outer ends, as shown in Fig. 1, to provide a square grill of maximum area, or one of said walls may be moved and secured inwardly to a desired extent, as the wall member 10 in Fig. 2, to provide a rectangular grill of smaller area.

The wall members 10, 11, 12 and 13 have a series of apertures 16 along their longitudinal peripheries opposite to the peripheries through which the slots 14 open. Said apertures in an opposed pair of walls with the slots directed downwardly are aligned to removably receive a number of rods 17 which form the top or cooking grate of the assembled grill. Each circular aperture 16 has a pair of diametrically opposed extensions or cuts 18, as is best seen in Figs. 5 and 6, which are adapted to receive two pairs of axially spaced-apart diametrically opposed lugs or shoulders 19 formed on one end of each rod 17. After inserting the outer pair of rod lugs into and through a selected wall aperture 16 by mutually registering the lugs 19 with the aperture extensions 18, each rod may be rotated to lock the same against undesired longitudinal movement and withdrawal, as shown in Fig. 5. The ends of the rods opposite said lugs or shoulders 19 are bent right angularly to the longitudinal axis of said rods to provide additional insurance against their movement and undesired withdrawal from a wall spaced from the wall engaging the shouldered ends of the rods. Said angular ends on the rods also provide convenient means for holding or turning the same for insertion or withdrawal.

To disassemble the grill it is merely necessary to rotate the rods 17 to a position wherein the lugs will pass through the aperture extensions 18 and to thereafter withdraw the same from the wall members. The wall members 10, 11, 12 and 13 may then be easily separated. As can be readily visualized, all four of the wall members are identical in size and shape, as are all of the rods or bars 17; hence, a very compact package results when the grill is in its collapsed position. The wall members and the rods, being the only parts in the device, and those of each set being identical, it is also apparent that the grill may be easily assembled into its working form.

Referring more particularly to Fig. 2, it will be observed that the bars 17 have been removed from the area between the wall members 11 and 13 which extends outwardly from the inwardly adjusted wall member 10, in the assembled grill of smaller cooking area. The rods might, however, be left in their inserted positions to provide a place on the top surface of the grill for maintaining food warm, that portion of said grate or top surface being slightly removed from the confined fire and being separated therefrom by the side member 10.

The wall members 10, 11, 12 and 13 are preferably of a limited length to permit the entire assembled device to be placed on top of or within a conventional outdoor grill. With this arrangement it is possible to utilize the present invention to reduce the amount of fuel ordinarily consumed in the standard grill, the improved grill being adjustable to a desired size and the charcoal or other fuel being placed within the confines of its four sides in their adjusted condition. In winter, or in the event of inclement weather, the improved adjustable grill may be placed within an indoor fireplace and the attraction of charcoal cooking or grilling preserved.

In the use of the device the wall members are first assembed and intermeshed to form a square or rectangle of the desired size, two of the transverse walls 10 and 12 having their slotted openings directed upwardly and the other two walls 11 and 13 having their slotted portions directed downwardly. In the event a limited amount of food is to be grilled, one of the side walls can be positioned inwardly of the ends of the engaging right angularly disposed walls to provide a rectangular grill on which the limited quantity of food may be cooked with a limited amount of fuel confined by the side walls. The rods 17 are then inserted through the aligned apertures 16 formed along the longitudinal top peripheries of two of the opposed wall members to form a grate. Said rods may be locked against undesired movement as previously described. Next, the desired limited amount of fuel is placed within the space defined by the four walls of the assembled grill and the food placed on the grate and cooked in the usual manner. The longitudinal slots 20 in each wall member adjacent the inner ends of the interlocking slots 14 serve as vents or draft orifices.

In addition to its primary function as a barbecue grill, the present invention is also highly satisfactory for use in broiling shishkebabs. In the latter case, the elongated skewers upon which the pieces of meat and other food are impaled may be rested in the tapered slot enlargements 15 and extended between the opposite wall members 10 and 12. As will be readily appreciated, the shishkebab skewers thus supported may be easily rotated, thereby permitting even and uniform broiling of the entire shishkebab.

From the foregoing description it is apparent that a very simple and novel form of grill has been provided which may be inexpensively constructed. There being only two sets of elements, the identical wall members and the identical rods, the entire structure can be economically manufactured and sold. In addition, the invention provides for the conservation of cooking fuel, is durable, and neat in appearance, and is well adapted for the purposes described.

It is to be understood that the invention is not to be limited to the exact details of construction or design shown or described, for obvious modifications will occur to persons skilled in the art.

I claim:

An adjustable and collapsible charcoal cooking grill, comprising: four identical, flat, upright wall members, each having throughout its length a series of spaced vertical slots extending half the height of the wall member, said slots having V-shaped enlargements at their outer ends and being adapted for detachable interlocking engagement with any selected slots of a pair of adjacent, right-angularly directed, inverted wall members to provide a square or rectangular, variable-sized charcoal enclosure, each wall member having formed along its longitudinal margin opposite said slots a series of spaced apertures with diametrically opposed extended cuts, the apertures in the opposite wall members being in alinement; a plurality of identical rods projecting into and through said alined apertures in the pair of opposed wall members having said apertures along their upper margins, said rods forming a top surface on said grill, one end of each of said rods being bent right angularly to provide a hook member and to facilitate handling of the rod, and the opposite end of each of said rods having two pairs of axially spaced-apart, diametrically opposed lugs, the outer pair of said lugs on each rod being projectable through the apertures and cuts in a wall so that said pairs of lugs are disposed on opposite sides of said wall, and so that when a rod is projected through said wall apertures and rotated to move its lugs out of registration with said aperture cuts said lugs abut both sides of the wall and prevent undesired longitudinal movement or withdrawal of the rod.

References Cited in the file of this patent
UNITED STATES PATENTS

| | | |
|---|---|---|
| 42,879 | Savier | May 24, 1864 |
| 794,627 | Klenk | July 11, 1905 |
| 970,342 | Kurt | Sept. 13, 1910 |
| 1,126,220 | Jackson | Jan. 26, 1915 |
| 1,169,049 | McPeak | Jan. 18, 1916 |
| 1,194,131 | Brown | Aug. 8, 1916 |
| 1,273,840 | Fassett | July 30, 1918 |
| 1,303,873 | Fogg | May 20, 1919 |
| 1,473,056 | Steen | Nov. 6, 1923 |
| 1,484,476 | Currie | Feb. 19, 1924 |
| 1,491,080 | Clark | Apr. 22, 1924 |
| 1,701,033 | Elbert | Feb. 5, 1929 |
| 1,879,837 | Bierlich | Sept. 27, 1932 |
| 2,075,473 | Schwary et al. | Mar. 30, 1937 |
| 2,335,020 | Nehrich | Nov. 23, 1943 |
| 2,512,223 | Contiguglia | June 20, 1950 |
| 2,740,395 | Goodwin | Apr. 3, 1956 |
| 2,608,190 | Winning et al. | Aug. 26, 1952 |
| 2,839,043 | La Born | June 17, 1958 |

FOREIGN PATENTS

| | | |
|---|---|---|
| 472,274 | France | July 31, 1914 |
| 308,104 | Great Britain | Mar. 21, 1929 |